United States Patent Office 3,658,781
Patented Apr. 25, 1972

3,658,781
BASIC MONOAZO DYESTUFFS CONTAINING A HETEROCYCLIC DIAZO COMPONENT
Gert Hegar, Schoenenbuch, Switzerland, assignor to Ciba Limited, Basel, Switzerland
No Drawing. Continuation-in-part of abandoned application Ser. No. 639,008, May 17, 1967. This application Dec. 9, 1969, Ser. No. 883,629
Claims priority, application Switzerland, May 23, 1966, 7,377/66; Mar. 8, 1967, 3,390/67
Int. Cl. C09b 29/08
U.S. Cl. 260—156                                                11 Claims

ABSTRACT OF THE DISCLOSURE

Basic azo dyestuffs containing a heterocyclic diazo component and as radical of the coupling component a para-alkylaminobenzene containing a heterocyclic tertiary or quaternary amine bound to the alkyl radical via its nitrogen atom.

CROSS-REFERENCE TO RELATED APPLICATIONS

This is a continuation-in-part of application Ser. No. 639,008, filed May 17, 1967, and now abandoned.

The present invention is based on the observation that valuable basic azo dyestuffs which are free from acidic groups imparting solubility in water, especially sulphonic acid or carboxylic acid groups, and which correspond to the formula

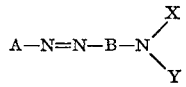

in which A represents the residue of a heterocyclic amine, B represents a benzene residue bound to the azo bridging group in para-position to the amino group, X represents a hydrogen atom, an alkyl group which may be substituted or an aryl, aralkyl or cycloalkyl group and Y represents an alkylene residue to which the nitrogen atom which is a ring member of a heterocyclic tertiary or quaternary amine is directly linked to an alkyl carbon atom, and in which N and X may be components of a heterocyclic ring fused to B, may be obtained when (a) a heterocyclic diazo compound is coupled with a coupling component of the formula

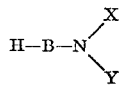

in which B represents a benzene residue capable of coupling in para-position to the amino group and X and Y have the meanings given above, or (b) and azo dyestuff of the formula

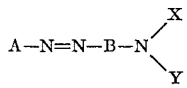

in which A, B and X have the meanings given above and Y represents an alkyl residue, especially a halogenated alkyl or sulphato-alkyl residue, containing an eliminable atom or an eliminable group, is reacted with a heterocyclic secondary or tertiary amine, the nitrogen atom of which is a member of the heterocyclic ring or is the only hetero atom present in the heterocyclic ring.

The amino group in the coupling components to be used in process (a) of the invention may be substituted, for example, by a phenyl, benzyl or cyclohexyl group, but preferably by an alkyl group which may be substituted, for example, by a methyl, ethyl, isopropyl, n-hexyl, β-cyanoethyl, β-hydroxyethyl, β-methoxyethyl, β-cyanoethoxyethyl, β-acetoxyethyl or β-phenoxyethyl group. It must, however, contain an aminoalkylene residue, the amino nitrogen atom of which is a member of a heterocyclic ring, especially a five-membered or a six-membered ring, for example, a pyridine, pyrimidine, morpholine or piperidine ring.

Coupling components of the kind defined which may be mentioned are as follows:

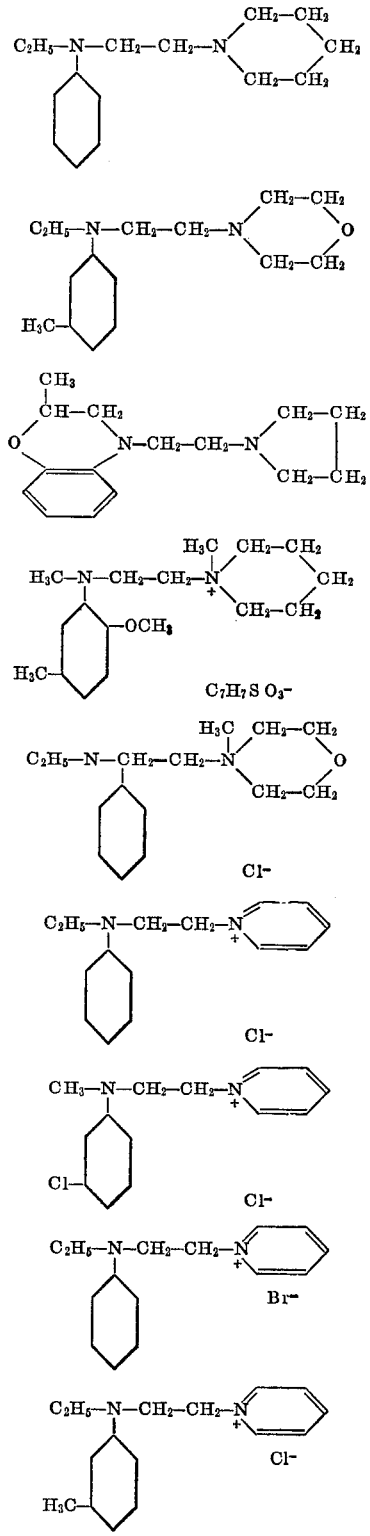

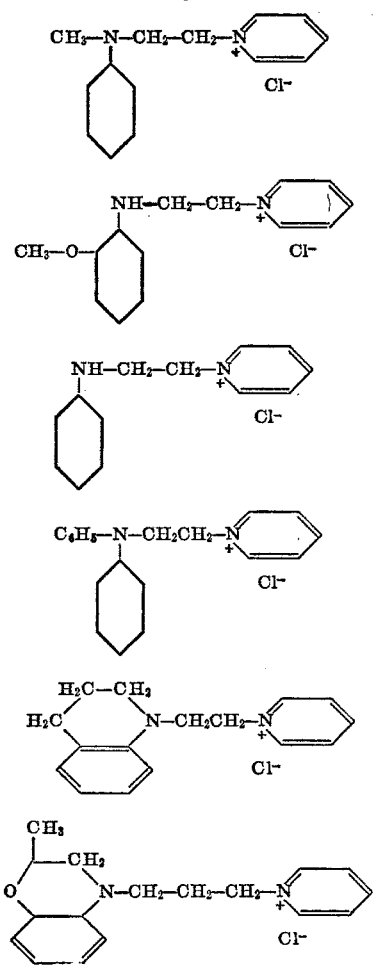

and also N,2-(N'-phenyl-N',β-cyanoethyl) - aminoethylpyridinium chloride or bromide, N,2-(N'-phenyl-N',β-acetoxyethyl) - aminoethylpyrimidinium chloride, N,2-(N'-phenyl - N',β - cyanoethoxyethyl) - aminoethylpyridinium chloride and the like. These compounds may be obtained by condensing the corresponding N-halogenalkylaniline with a secondary or tertiary heterocyclic base, for example, pyridine, morpholine, thiomorpholine, quinoline, piperidine, pyrimidine, pyrrolidine and the like.

The diazo component used may be any diazotizable heterocyclic amine which is free from acidic substituents imparting solubility in water, but especially an amine which contains a five-membered heterocyclic ring having 2 or 3 hetero atoms, especially a nitrogen atom and one or two sulphur, oxygen or nitrogen atoms.

Heterocyclic diazo components which may be mentioned are, for example, the following:

2-aminothiazole,
2-amino-5-nitrothiazole,
2-amino-5-cyanothiazole,
2-amino-4-methyl-5-nitrothiazole,
2-amino-4-methylthiazole,
2-amino-4-phenylthiazole,
2-amino-4-(4'-chloro)-phenylthiazole,
3-aminopyridine,
3-aminoquinoline,
3-aminopyrazole,
3-amino-1-phenylpyrazole,
3-aminoindazole,
3-amino-1,2,4-triazole,
3-amino-1-(4'-methoxyphenyl)-pyrazole,
2-aminobenzthiazole,
2-amino-6-methylbenzthiazole,
2-amino-6-cyanobenzthiazole,
2-amino-6-methoxybenzthiazole,
2-amino-6-carbethoxybenzthiazole,
2-amino-6-chlorobenzthiazole,
2-amino-6-methylsulphonyl benzthiazole,
2-amino-6-nitrobenzthiazole,
2-amino-1,3,4-thiadiazole,
2-amino-1,3,5-thiadiazole,
2-amino-4-phenyl- or
4-methyl-1,3,5-thiadiazole.

Diazotization of the above-mentioned diazo components may be carried out by known methods, for example, with a mineral acid, especially hydrochloric acid, and sodium nitrite.

Coupling may also be carried out in known manner, for example, in an acid to weakly alkaline medium, if necessary, in the presence of sodium acetate or a similar buffer which influences the rate of coupling, or a catalyst, for example, pyridine or the salts thereof.

In process (b) of the invention, dyestuffs containing halogen- or sulphato-alkyl groups are reacted with secondary or tertiary amines of the heterocyclic series, for example, pyridine, picoline, lutidine, piperidine, piperazine, morpholine, quinoline, pyrimidine, pyrrolidine, thiomorpholine and the like, advantageously by heating in an excess of the amine in the presence or absence of a solvent. The dyestuffs containing halogen- or sulphato-alkyl groups are preferably obtained by diazotizing one of the above-mentioned amines of the heterocyclic series and coupling the diazo compound with a sulphato-alkyl- or halogen-alkyl-aniline, for example, N-methyl- or N-ethyl - N,β - chloroethylaniline, N,β - cyanoethyl—N,β-chloroethylaniline or N-ethyl-N,β-sulphatoethylaniline.

The dyestuff may be purified, if necessary by dissolving the dyestuff salts in water and filtering any unreacted starting dyestuff that may be present as insoluble residue. The dye-stuff can then be precipitated from the aqueous solution by the addition of a water-soluble salt, for example, sodium chloride.

The quaternated dyestuffs obtained by the process of the invention preferably contain as anion the residue of a strong acid, for example, sulphuric acid or a semi-ester thereof, or the residue of an arylsulphonic acid or a halogen ion. The abovementioned anions introduced into the dyestuff molecule in accordance with the invention may also be replaced by anions of other inorganic acids, for example, by anions of phosphoric or sulphuric acid, or by anions of organic acids, for example, formic, acetic, chloroacetic, oxalic, lactic or tartaric acid; in certain cases it is also possible to use the free bases. The dyestuff salts may also be in the form of double salts, for example, with halides of elements of Group II of the Periodic Table, especially zinc chloride or cadmium chloride.

The dyestuffs obtained in accordance with the invention or dyestuffs containing a quaternated amino group are suitable for dyeing and printing a very wide variety of synthetic fibres, for example, polyvinyl chloride, polyamide and polyurethane fibres, and also fibres made from polyesters of aromatic dicarboxylic acids, for example, polyethylene terephthalate fibres, but especially polyacrylonitrile fibres or polyvinylidene cyanide fibres (Darvan). By polyacrylonitrile fibres is meant principally polymers containing more than 80 percent of acrylonitrile, for example, 80 to 95 percent; they also contain 5 to 20 percent of vinyl acetate, vinylpyridine, vinyl chloride, vinylidene chloride, acrylic acid, acrylic acid ester, methacrylic acid, methacrylic acid ester and so forth. These products are sold under the following registered trademarks: "Acrilan 1656" (Chemstrand Corporation, Decatur, Alabama, U.S.A.), "Acrilan 41" (Chemstrand Corportion), "Creslan" (American Cyanamid Company), "Orlon 44" (Du Pont), "Crylor HH" (Soc. Rhodiacéta Sa, France), "Leacryl N" (Applicazioni Chimice Società per Azioni, Italy), "Dynel" (Union Carbide Chem. Corp.), "Exlan" (Japan. Exlan Industry Co., Japan), "Vonnel" (Mitsubishi, Japan), "Verel" (Tennessee Eastman, U.S.A.), "Zefran" (Dow Chemical, U.S.A.) "Wolcrylon" (Filmfabrik Agfa, Wolfen), "Ssaniw (U.S.S.R.), and also "Orlon 42," "Dralon," "Courtelle" and so forth.

The new dyestuffs produce on these fibres, which may also be dyed in admixture with one another intense and level dyeings possessing good fastness to light and good properties of general fastness, especially good fastness to washing, perspiration, sublimation, crease-resist finishing, decatizing, hot-pressing, rubbing, carbonizing, water, sea water, dry cleaning, cross-dyeing and solvents. The new dyestuffs of the invention also display, inter alia, good stability in a wide pH range, good affinity in aqueous solutions of different pH values and a good fastness to kier-boiling. Furthermore, the new dyestuffs reserve well on wool and other natural or synthetic polyamide fibres.

The quaternated, water-soluble dyestuffs generally show little sensitivity to electrolytes, and some of them display exceptionally good solubility in water or organic solvents. Dyeing with the quaternated, water-soluble dyestuffs is generally carried out in an aqueous neutral or acid medium at the boil under atmospheric pressure or in a closed vessel at an elevated temperature and under superatmospheric pressure. The ordinary commercially available levelling agents have no deleterious effect if used, but they are not necessary.

The said dyestuffs are also highly suitable for three-colour dyeing. Furthermore, by virtue of their stability to hydrolysis, they may be used with advantage in high-temperature dyeing and for dyeing in the presence of wool. They may also be applied to fibrous materials by printing processes. In this method of application, a printing paste, for example, is used which, in addition to the dyestuff, contains the usual printing adjuvants. The dyestuffs are also suitable for the bulk colouration of acrylonitrile polymerization products and other synthetic materials, if necessary, in solution, the colourations being fast to light and to washing. They are also suitable for colouring oil paints and lacquers, and dyeing cotton, especially mordanted cotton, cellulose, regenerated cellulose and paper.

The new dyestuffs manufactured by the process of the invention which are insoluble in water and which contain a tertiary amino group are advantageously used in a state of fine division and in the presence of a dispersing agent, for example, soap, sulphite cellulose waste liquor or a synthetic detergent, or a combination of different wetting and dispersing agents. Prior to dyeing it is generally advantageous to convert the dyestuff into a dyeing preparation which contains a dispersing agent and the finely divided dyestuff in a form such that a fine dispersion is formed when the preparation is diluted with water. Such dyestuff preparations may be obtained in known manner, for example, by precipitating the dyestuff from sulphuric acid and grinding the suspension so obtained with sulphite cellulose waste liquor. If necessary, the dyestuff may also be ground in a highly efficient grinding device in the dry or wet state in the presence or absence of a dispersing agent. They are also suitable for dyeing and printing a very wide variety of synthetic fibres, for example, polyacrylonitrile, polyvinyl chloride, polyamide or polyurethane fibres, but especially fibres made from polyesters of aromatic dicarboxylic acids, for example, polyethylene terephthalate fibres.

To achieve stronger dyeings, for example, on polyethylene terephthalate fibres, it has been found to be advantageous to add a swelling agent to the dyebath, or to carry out the dyeing process under superatmospheric pressure at a temperature above 100° C., for example, at 120° C. Suitable swelling agents are aromatic carboxylic acids, for example, benzoic acid or salicylic acid, phenols, for example, ortho- or para-hydroxydiphenyl, aromatic halogenated compounds, for example, chlorobenzene, ortho-dichlorobenzene or trichlorobenzene, phenylmethylcarbinol or diphenyl. When carrying out the dyeing process under superatmospheric pressure it is generally advantageous to render the dyebath slightly acid, for example, by the addition of a weak acid, for example, acetic acid.

The new dyestuffs having a tertiary amino group are specially suitable for application by the so-called thermofixation process in which the fabric to be dyed is impregnated at a temperature not exceeding 60° C. with an aqueous dispersion of the dyestuff which advantageously contains 1 to 50 percent of urea and a thickening agent, especially sodium algenate and squeezed in the usual manner. It is advantageously squeezed so as to retain 50 to 100 percent of its dry weight of dye-liquor.

To fix the dyestuff, the fabric so impregnated is heated to a temperature above 100° C., for example, to a temperature between 180 and 220° C., preferably after it has been dried, for example, in a current of warm air.

The above-mentioned thermofixation process is especially suitable for dyeing union fabrics made from polyester fibres and cellulosic fibres, especially cotton. In this case, the padding liquor contains, in addition to the dyestuff to be used in accordance with the invention, dyestuffs which are suitable for dyeing cotton, for example, direct dyestuffs or vat dyestuffs, or especially so-called reactive dyestuffs, that is to say, dyestuffs that can be fixed on the cellulosic fibre with formation of a chemical bond, for example, dyestuffs which contain a chlorotriazine or a chlorodiazine residue. In the latter case, it has been found to be advantageous to add an agent capable of binding acid to the padding solution, for example, an alkali metal carbonate or an alkali metal phosphate or an alkali metal borate or perborate, of a mixture thereof. When using vat dyestuffs, the padded fabric has to be treated subsequent to the heat treatment with an aqueous alkaline solution of one of the reducing agents commonly used in vat dyeing.

The dyeings produced on polyester fibres by the said process are advantageously subjected to an after-treatment, for example, by heating with an aqueous solution of a non-ionic detergent.

The said dyestuffs are also suitable for dyeing union fabrics made from polyester fibre and wool; the wool portion of the fabric is reserved and can subsequently be dyed with a wool dyestuff.

The dyestuffs may also be applied by a printing process. In this method of application the printing pastes contain, for example, the finely divided dyestuff, if necessary, in admixture with one of the above-mentioned cotton dyestuffs, if necessary, in the presence of urea and/or an agent capable of binding acid, together with the adjuvants normally used in printing, for example, wetting and thickening agents.

The above described processes produce strong dyeings and prints possessing distinguished properties of fastness, especially good fastness to light, sublimation, decatizing, washing and chlorinated. A further advantage offered by the dyestuffs to be used in accordance with the invention is that they reserve well on wool and cotton.

Unless otherwise stated, the parts and percentages in the following examples are by weight, and the temperatures are expressed in degrees centigrade.

EXAMPLE 1

3.88 parts of 2-amino-6-ethoxybenzthiazole are diazotized in known manner with sodium nitrite in 85% sulphuric acid. The solution of diazo compound in sulphuric acid is added dropwise to a solution of 5.25 parts of N,β-(N'-ethyl-N'-phenyl)-aminoethylpyridinium chloride in 100 parts of ice and 100 parts of water, and the coupling mixture is rendered neutral to Congo paper by the addition of sodium acetate. After coupling, the dyestuff is precipitated from the deep red solution by the addition of sodium chloride. It dyes polyacrylonitrile fibres strong red tints possessing a very good fastness to light.

Dyestuffs which yield the shades listed in Column III of the following table may be obtained by using the diazo components listed in Column II instead of 2-amino-6-ethoxybenzthiazole.

| I | II | III |
|---|---|---|
| 1 | 2-amino-6-ethylbenzthiazole | Red. |
| 2 | 2-amino-5-nitrothiazole | Violet. |
| 3 | 2-amino-5-nitro-4-methylthiazole | Do. |
| 4 | 3-amino-1,2,4-triazole | Yellow. |
| 5 | 5-amino-3-phenyl-1,2-4-thiadiazole | Red. |
| 6 | 2-amino-5-phenyl-1,3,4-thiadiazole | Red. |
| 7 | 2-amino-1,3,4-thiadiazole | Orange. |
| 8 | 2-amino-4-phenyl-1,3-thiazole | Red. |
| 9 | 2-amino-6-nitrobenzthiazole | Violet. |

Dyeing prescription 1 part of dyestuff is dissolved in 5,000 parts of water with the addition of 2 parts of 40% acetic acid. 100 parts of dried polyacrylonitrile staple fibre yarn are entered into this dyebath at 60° C., the temperature is raised to 100° C. within 30 minutes, and dyeing is carried out at the boil for one hour. The yarn is then well rinsed and dried.

EXAMPLE 2

9.4 parts of 3-aminopyridine are dissolved in water with the addition of 25 ml. of concentrated hydrochloric acid and then diazotized at 0° C. with an aqueous solution of 6.9 parts of sodium nitrite. The diazonium chloride solution is run into an aqueous solution of 24.9 parts of N,β-(N'-methyl-N'-phenyl)-aminoethylpyridinium chloride at 0 to 5° C., the pH of the coupling mixture is adjusted to 5 to 5.5 by the slow, dropwise addition of dilute sodium hydroxide solution, and the dyestuff which forms is isolated by salting out with sodium bromide. It dyes polyacrylonitrile fibres yellow tints possessing a good fastness to light.

Dyestuffs which yield the shades listed in Column III of the following table may be obtained by using the diazo components listed in Column II instead of 3-aminopyridine.

| I | II | III |
|---|---|---|
| 1 | 2-amino-6-ethoxybenxthiazole | Red. |
| 2 | 5-amino-3-phenyl-1,2,4-thiadiazole | Red. |
| 3 | 2-amino-1,3,4-thiadiazole | Orange. |
| 4 | 2-amino-5-methyl-1,3,4-thiadiazole | Do. |
| 5 | 2-amino-5-nitrothiazole | Violet. |

EXAMPLE 3

The procedure described in Example 1 is followed, but the coupling component used is a solution of 5.5 parts of N,β - (N'chloropyridinium) - ethyl-1,2,3,4-tetrahydroquinoline. The dyestuffs obtained dyes polyacrylonitrile fibres fast claret tints. Dyestuffs which yield the shades listed in Column III of the following table may be obtained by using the diazo components listed in Column II.

| I | II | III |
|---|---|---|
| 1 | 2-amino-5-nitrothiazole | Blue. |
| 2 | 5-amino-3-phenyl-1,2,4-thiadiazole | Claret. |
| 3 | 2-amino-5-phenyl-1,3,4-thiadiazole | Do. |
| 4 | 2-amino-4-methyl-5-nitrothiazole | Blue. |

Dyestuffs having very similar properties are obtained when the N,β - (N'-chloropyridinium) - ethyltetrahydroquinoline is replaced by 2-methyl-4-(β-N'-chloropyridinium)-ethylbenzomorpholine.

In Column II of the following table there are listed further azo dyestuffs which are obtained by coupling in accordance with Examples 1 to 3; the shades produced on polyacrylonitrile are listed in Column III.

| I | II | III |
|---|---|---|
| 1 | $C_2H_5O$-benzothiazole-C=N=N-phenyl(Cl)-N(CH_3)(C_2H_4-N^+-pyridinium) Cl^- | Red. |
| 2 | $C_2H_5O$-benzothiazole-C=N=N-phenyl(OCH_3)(CH_3)-N(CH_3)(C_2H_4-N^+-pyridinium) Cl^- | Claret. |
| 3 | $C_2H_5O$-benzothiazole-C=N=N-phenyl-N(CH_2-cyclohexyl)(CH_2CH_2-N^+-pyridinium) Cl^- | Scarlet. |
| 4 | $C_2H_5O$-benzothiazole-C=N=N-phenyl-N(CH_2CH_2CN)(CH_2CH_2-N^+-pyridinium) $C_7H_7SO_3^-$ | Do. |
| 5 | $C_2H_5O$-benzothiazole-C=N=N-phenyl(Cl)-N(CH_3)(CH_2CH_2-N^+-pyridinium) Br^- | Red. |
| 6 | $C_2H_5O$-benzothiazole-C=N=N-phenyl(CH_3)-N(C_2H_5)(C_2H_4-N^+-pyridinium) Cl^- | Red. |
| 7 | $O_2N$-thiazole-C=N=N-phenyl(Cl)-N(CH_3)(C_2H_4-N^+-pyridinium) Cl^- | Violet. |

| I | II | III |
|---|---|---|
| 8 | (nitro-thiazole)—C—N=N—(cyclohexyl with OCH₃, CH₃, N(CH₃)(C₂H₄-pyridinium) Cl⁻) | Blue. |
| 9 | (nitro-thiazole)—C—N=N—(cyclohexyl N(C₂H₅)(C₂H₄-pyridinium) Br⁻) | Violet. |
| 10 | (nitro-thiazole)—C—N=N—(cyclohexyl N(CH₂-cyclohexyl)(C₂H₄-pyridinium) Cl⁻) | Do. |
| 11 | (nitro-methyl-thiazole)—C—N=N—(cyclohexyl-CH₃ N(C₂H₅)(C₂H₄-pyridinium) Cl⁻) | Blue. |
| 12 | (nitro-thiazole)—C—N=N—(cyclohexyl-CH₃ N(C₂H₅)(C₂H₄-pyridinium) Cl⁻) | Do. |
| 13 | (triazole HC=N, NH)—C—N=N—(cyclohexyl-Cl N(C₂H₅)(C₂H₄-pyridinium) I⁻) | Yellow. |
| 14 | (triazole CH=N, NH)—C—N=N—(cyclohexyl-CH₃ N(C₂H₅)(C₂H₄-pyridinium) ClO₄⁻) | Orange. |
| 15 | (phenyl-thiadiazole)—C—N=N—(cyclohexyl-CH₃ N(C₂H₅)(C₂H₄-pyridinium) Cl⁻) | Red. |
| 16 | (phenyl-thiadiazole)—C—N=N—(cyclohexyl-Cl N(C₂H₅)(C₂H₄-pyridinium) Br⁻) | Red. |
| 17 | (phenyl-thiadiazole)—C—N=N—(cyclohexyl OCH₃, CH₃ N(CH₃)(C₂H₄-pyridinium) Cl⁻) | Claret. |
| 18 | (phenyl-thiadiazole)—C—N=N—(cyclohexyl N(CH₂CH₂CN)(CH₂CH₂-pyridinium) Br⁻) | Scarlet. |
| 19 | (phenyl-thiadiazole)—C—N=N—(cyclohexyl-Cl N(C₂H₅)(C₂H₄-pyridinium) Cl⁻) | Red. |
| 20 | (thiadiazole HC)—C—N=N—(cyclohexyl N(C₂H₅)(C₂H₄-pyridinium) ZnCl₃⁻) | Orange. |
| 21 | (phenyl-thiazole)—C—N=N—(cyclohexyl-CH₃ N(C₂H₅)(C₂H₄-pyridinium) Br⁻) | Red. |

| I | II | III |
|---|---|---|
| 22 | 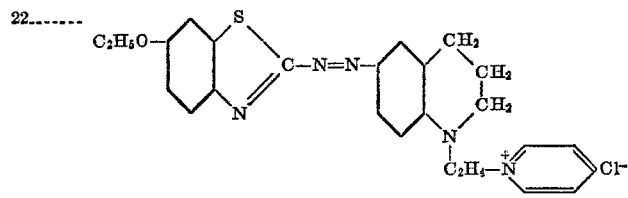 | Claret. |
| 23 | 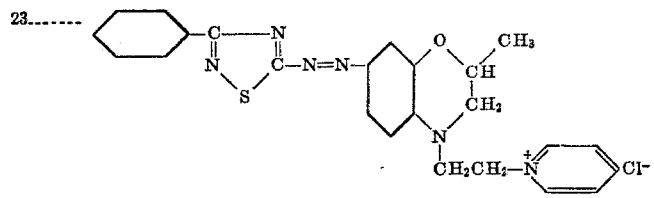 | Do. |

EXAMPLE 4

17.7 parts of 5-amino-3-phenyl-1,2,4-thiadiazole are dissolved in a mixture of 85 parts of glacial acetic acid and 16 parts of propionic acid, and the solution is added dropwise to a mixture of 100 parts by volume of N nitrosylsulphuric acid, 85 parts of glacial acetic acid and 15 parts of propionic acid. The batch is stirred at 15° C. until a clear, yellowish solution forms, and then 2 parts of urea are added. A solution of 18.4 parts of N-ethyl-N,2'-chloroethylaniline in 100 parts of glacial acetic acid is run into the diazo solution, the batch is stirred for 1 hour at 10° C., and then poured into a solution of 500 parts of sodium acetate crystals in 3,000 parts of water. The red dyestuff which precipitates is isolated by suction filtration, washed with water and dried. 18.6 parts of the dyestuff are dissolved in 50 parts of N-methylpiperidine and the solution is stirred under reflux for 14 hours with the addition of 0.5 part of sodium iodide until a test sample gives a clear solution in water. The reaction mixture is poured into 1,300 parts of water, 60 parts of sodium chloride are added, and the batch is stirred until the dyestuff precipitates in the form of crystals. The dyestuff is isolated by filtration and dried. A red powder is obtained which dyes polyacrylonitrile fibres brilliant red shades of a high degree of fastness when applied in an aqueous bath.

Similar red dyestuffs are obtained when the N-methylpiperidine is replaced by pyridine, piperidine, morpholine, N-methylmorpholine or N-methylpyrrolidine.

EXAMPLE 5

10.0 parts of the monoazo dyestuff of the formula

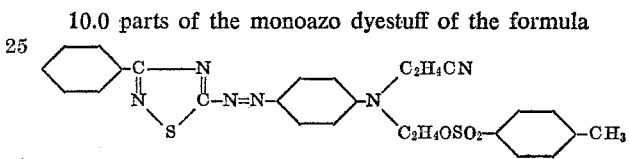

are heated for 3 hours under reflux together with 20 parts of anhydrous pyridine. The reaction mixture is diluted with 100 parts of anhydrous chlorobenzene and the quaternary salt precipitates in crystalline form. It is isolated by filtration, washed with a small amount of benzene and dried. The dyestuff so obtained dyes polyacrylonitrile fibres brilliant scarlet shades possessing a very good fastness to light.

The following table shows further dyestuffs of the general formula

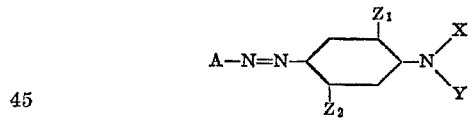

which may be obtained by the method described in Examples 4 and 5. The atoms and groups represented by the symbols A, $Z_1$, $Z_2$, X and Y are also indicated in the table.

| Number | A | X | Y | $Z_1$ | $Z_2$ | Shade |
|---|---|---|---|---|---|---|
| 1 | ![C₂H₅O-benzothiazole]  C₂H₅O—(benzothiazole)—C— | CH₃ | H₃C\\CH₂—CH₂\\ —CH₂CH₂—N—CH₂—CH₂ / CH₃SO₄ | OCH₃ | CH₃ | Claret. |
| 2 | Same as above | —CH₂—⟨phenyl⟩ | —CH₂CH₂—N⟨pyridinium⟩ / CH₃CO₂ | H | H | Scarlet. |
| 3 | O₂N—(thiazole)—C— | —CH₃ | —(CH₂)₃—N⟨pyridinium⟩ / (SO₄)½ | H | Cl | Violet. |
| 4 | Same as above | —CH₃ | —C₂H₄—N⟨piperidinium⟩ CH₂—CH₂ / CH₂ \\ CH₂—CH₂ | OCH₃ | CH₃ | Blue. |
| 5 | do | —CH₃ | —C₂H₄—N⟨pyridinium⟩ / C₆H₅SO₃ | OCH₃ | CH₃ | Do. |

| Number | A | X | Y | $Z_1$ | $Z_2$ | Shade |
|---|---|---|---|---|---|---|
| 6 | Same as number 3 | $-C_2H_5$ | 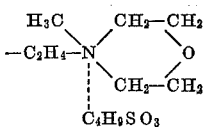 | H | H | Violet. |
| 7 | do | $-C_2H_5$ | 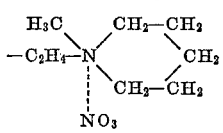 | H | H | Do. |
| 8 | do | $-CH_2CH_2-CN$ | Same as above | H | H | Do. |
| 9 | do | $-CH_2CH_2-CH_3$ | 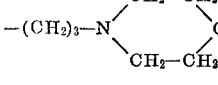 | H | $CH_3$ | Blue. |
| 10 | do | 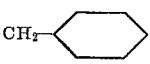 | 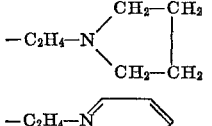 | H | H | Violet. |
| 11 |  | $-CH_2CH_2-CN$ | 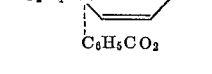 | H | H | Scarlet. |
| 12 | 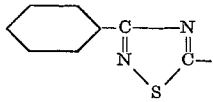 | $-CH_2CH_2OCH_3$ | 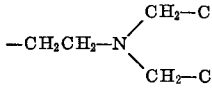 | H | $CH_3$ | Red. |
| 13 | Same as above | $-C_2H_5$ | 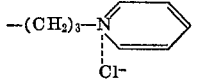 | H | H | Red. |
| 14 | 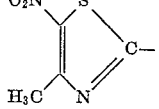 | $-C_2H_5$ | 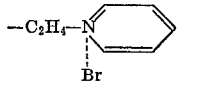 | H | $CH_3$ | Blue. |
| 15 | 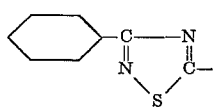 | $-C_2H_5$ | Same as above | H | $CH_3$ | Red. |
| 16 | Same as above | $-C_2H_5$ | 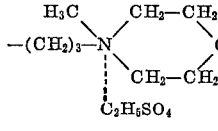 | H | H | Red. |
| 17 | do | $-C_2H_5$ | 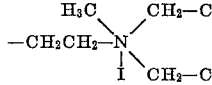 | H | $CH_3$ | Red. |
| 18 | do | $-CH_3$ | 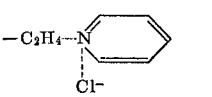 | $OCH_3$ | H | Red. |
| 19 | do | $-CH_3$ | Same as above | $OCH_3$ | $CH_3$ | Claret. |
| 20 | do | $-C_2H_4OCH_3$ | 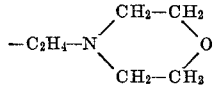 | H | $CH_3$ | Red. |
| 21 | do | $-CH_2CH_2COOCH_3$ | 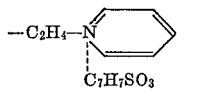 | H | H | Red. |
| 22 | do | $-CH_2CH_2O-$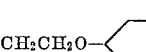 | Same as above | H | $CH_3$ | Red. |
| 23 | $O_2N-C\overset{S}{\underset{HC\;\;\;\;N}{\diagdown\diagup}}C-$ | $-CH_2CH_2OCOCH_3$ | do | H | H | Violet. |

| Number | A | X | Y | $Z_1$ | $Z_2$ | Shade |
|---|---|---|---|---|---|---|
| 24 | H-C=N, N-C- with NH (triazole) | —CH₃ | —C₂H₄—N(pyridinium) | —OCH₃ | —CH₃ | Scarlet. |
| 25 | Same as above | —CH₂—C₆H₅ | Same as above | H | H | Yellow. |
| 26 | C₆H₅-C(=N-N=)C- with S (thiadiazole with phenyl) | —C₂H₅ | do | H | H | Red. |
| 27 | Same as above | —C₂H₅ | —C₂H₄—N⁺(CH₃)(CH₂CH₂)(CH₂CH₂) · C₃H₇CO₂⁻ | H | HC₃ | Red. |
| 28 | do | —CH₂CH₂CN | —C₂H₄—N⁺(piperidine-CH₃) | H | H | Scarlet. |
| 29 | do | —CH₂CH₂OCH₃ | —C₂H₄—N(pyridinium) · NO₃ | H | H | Red. |
| 30 | do | H | Same as above | OCH₃ | H | Red. |
| 31 | do | H | —C₂H₄—N(pyridinium) · Br | OCH₃ | CH₃ | Claret. |
| 32 | do | CH₃ | —(CH₂)₃—N(morpholine) | OCH₃ | CH₃ | Do. |
| 33 | H₃C-C(=N-N=)C- with S (thiadiazole) | C₂H₅ | —C₂H₄—N(pyridinium) · Cl | H | H | Orange. |
| 34 | HC(=N-N=)C- with S (thiadiazole) | C₂H₅ | —C₂H₄—N⁺(CH₃)(CH₂CH₂)(CH₂CH₂)CH(CH₃) · (SO₄)½ | H | CH₃ | Do. |
| 35 | quinoline | C₂H₅OH | —C₂H₄—N⁺(2-methyl-6-ethylpyridinium) Cl⁻ | H | C₂H₅ | Yellow. |
| 36 | HN-N=CH-CH=C- (imidazole) | C₂H₅O C₂H₅CN | —C₂H₄—N⁺(H₅C₂)(CH₂CH(CH₃))(CH₂CH₂)NH Cl⁻ | C₂H₅ | C₂H₅ | Do. |
| 37 | benzimidazole | —CH(CH₂CH₂)(CH₂CH₂)CH₂ (cyclohexyl) | —C₂H₄—N⁺(2-methylquinolinium) Cl⁻ | OC₃H₇ | CH₃ | Yellowish-brown. |

I claim:
1. Basic azo dyestuffs of the formula

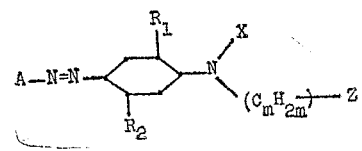

wherein A is a radical selected from the group consisting of 5-nitrothiazole,
5-cyanothiazole,
benzthiazole,
6-lower alkylbenzthiazole,
6-lower alkoxybenzthiazole,
6-carbo-lower alkoxybenzthiazole, 6-chlorobenzthiazole,
6-lower alkylsulfonylbenzthiazole,
6-nitrobenzthiazole,
1,3,4-thiazole,
5-phenyl-1,3,4-thiadiazole,
5-lower alkyl-1,3,4-thiadiazole,
1,3,5-thiadiazole,
4-phenyl-1,3,5-thiadiazole,
4-lower alkyl-1,3,5-thiadiazole,
4-lower alkyl-5-nitrothiazole,
4-lower alkyl thiazole,
4-phenylthiazole,
4-(4'-chlorophenyl)-thiazole,
6-cyanobenzthiazole and
1,3,4-thiadiazole, $R_1$ and $R_2$ are each selected from the group consisting of hydrogen, chlorine, lower alkyl and lower alkoxy, X is selected from the group consisting of hydrogen, lower alkyl, cyclohexyl and a substituent of the formula $$-(CH_2)_n-Y$$

wherein Y is lower alkoxy, phenoxy, carbo lower alkoxy, lower alkanoloxy, phenyl, hydroxy, cyano and cyano-lower alkoxy, n is an integer of from 1 to 2, m is an integer of from 2 to 3 and Z is selected from the group consisting of an unsubstituted or lower alkyl-substituted tertiary and quaternary pyridine and piperidine, bound to the alkylene bridge via its nitrogen atom and containing, when quaternized, an anion of a strong inorganic acid, of a sulfuric acid semi ester, of a carboxylic or of a sulfonic acid.

2. Basic azo dyestuffs as claimed in claim 1, whrein $R_1$ and $R_2$ is hydrogen, Z is a pyridinium radical and X is ethyl, β-cyanoethyl or acetoxyethyl.

3. The basic azo dyestuff according to claim 1 which corresponds to the formula

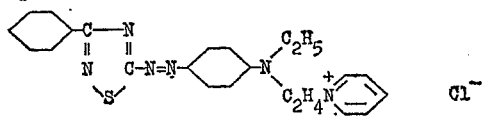

4. The basic azo dyestuff according to claim 1 which corresponds to the formula

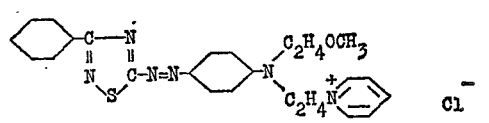

5. The basic azo dyestuff according to claim 1 which corresponds to the formula

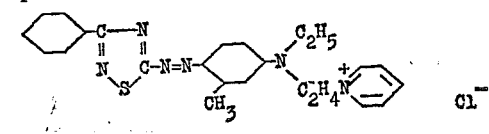

6. The basic azo dyestuff according to claim 1 which corresponds to the formula

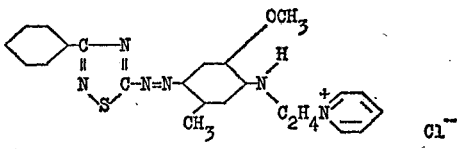

7. The basic azo dyestuff acocrding to claim 1 which corresponds to the formula

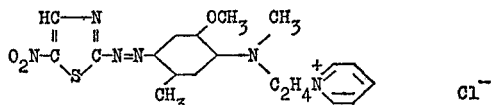

8. The basic azo dyestuff according to claim 1 which corresponds to the formula

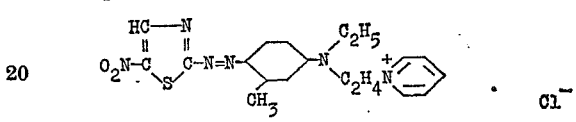

9. The basic azo dyestuff according to claim 1 which corresponds to the formula

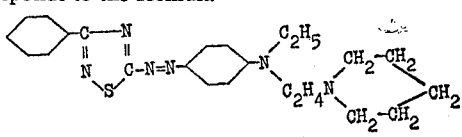

10. The basic azo dyestuff according to claim 1 which corresponds to the formula

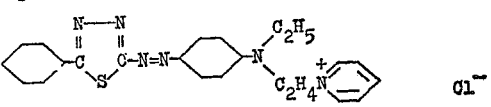

11. The basic azo dyestuff according to claim 1 which corresponds to the formula

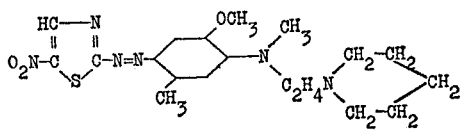

References Cited
UNITED STATES PATENTS 2,099,525   11/1937   Krzikalla et al. _____ 260—156
3,033,847   5/1962    Sartori _____ 260—158

JOSEPH REBOLD, Primary Examiner

D. M. PAPUGA, Assistant Examiner

U.S. Cl. X.R.

260—146 R, 155, 158, 244 R, 247.5, 286 Q, 288 R, 293.73, 293.79, 296 R; 268—21 C, 25, 41 A, 41 C, 163, 173, 175, 176